(12) United States Patent
Maeda et al.

(10) Patent No.: US 11,946,144 B2
(45) Date of Patent: Apr. 2, 2024

(54) ELECTROLESS PALLADIUM PLATING SOLUTION

(71) Applicant: C. Uyemura & Co., Ltd., Osaka (JP)

(72) Inventors: Tsuyoshi Maeda, Osaka (JP);
Katsuhisa Tanabe, Osaka (JP);
Tomohiro Kawahara, Osaka (JP)

(73) Assignee: C. UYEMURA & CO., LTD., Osaka (JP)

( * ) Notice: Subject to any disclaimer, the term of this patent is extended or adjusted under 35 U.S.C. 154(b) by 86 days.

(21) Appl. No.: 16/753,395

(22) PCT Filed: Oct. 3, 2018

(86) PCT No.: PCT/JP2018/036971
§ 371 (c)(1),
(2) Date: Apr. 3, 2020

(87) PCT Pub. No.: WO2019/069965
PCT Pub. Date: Apr. 11, 2019

(65) Prior Publication Data
US 2020/0318239 A1    Oct. 8, 2020

(30) Foreign Application Priority Data
Oct. 6, 2017   (JP) .................. 2017-195652

(51) Int. Cl.
| | | |
|---|---|---|
| C23C 18/44 | (2006.01) | |
| C09D 5/00 | (2006.01) | |
| C09D 5/02 | (2006.01) | |

(52) U.S. Cl.
CPC ............... C23C 18/44 (2013.01); C09D 5/00 (2013.01); C09D 5/024 (2013.01)

(58) Field of Classification Search
None
See application file for complete search history.

(56) References Cited

U.S. PATENT DOCUMENTS

| | | | |
|---|---|---|---|
| 4,804,410 A | 2/1989 | Haga et al. | |
| 2003/0113576 A1* | 6/2003 | Chebiam | C23C 18/48 428/673 |
| 2003/0149187 A1 | 8/2003 | Kano et al. | |
| 2005/0019502 A1 | 1/2005 | Kano et al. | |
| 2008/0138528 A1 | 6/2008 | Gross et al. | |
| 2009/0081369 A1 | 3/2009 | Aiba et al. | |
| 2012/0118196 A1 | 5/2012 | Watanabe et al. | |
| 2013/0152786 A1 | 6/2013 | Correia et al. | |
| 2014/0242265 A1 | 8/2014 | Hirsekorn et al. | |
| 2020/0318239 A1 | 10/2020 | Maeda et al. | |

FOREIGN PATENT DOCUMENTS

| | | | |
|---|---|---|---|
| CN | 102449192 | 5/2012 | |
| CN | 103857826 | 6/2014 | |
| CN | 106480437 | 3/2017 | |
| EP | 1 331 285 | 7/2003 | |
| EP | 2 196 563 | 6/2010 | |
| JP | 5214551 | 8/1993 | |
| JP | 7-263493 | 10/1995 | |
| JP | 2003313674 A | * 11/2003 | ............ C23C 18/16 |
| JP | 2006-83446 | 3/2006 | |
| JP | 2007-9305 | 1/2007 | |
| JP | 4596553 | 12/2010 | |
| JP | 4792045 | 10/2011 | |
| JP | 2011-225927 | 11/2011 | |
| TW | 201317389 | 5/2013 | |
| WO | 2012/030212 | 3/2012 | |

OTHER PUBLICATIONS

Jiang et al., Study on physical and chemical behaviors of rare earths in preparing tube supported palladium film by electroless plating, Journal of Rare Earths, 2006, 24, 259 (Year: 2006).*
Machine translation of Teruaki et al., JP2006083446A (Year: 2006).*
Machine translation of Rhee et al., JP 2003313674 A (Year: 2003).*
Rao et al., Chemical and electrochemical depositions of platinum group metals and their applications, Coordination Chemistry Reviews, 2005, 613-631 (Rao) (Year: 2005).*
Extended European Search Report dated May 31, 2021 in corresponding European Patent Application No. 18864488.4.
Office Action dated Nov. 18, 2021 issued in corresponding Taiwanese Patent Application No. 107135168 with English translation.
Office Action dated Nov. 18, 2021 issued in Taiwanese Patent Application No. 107135158 with English translation.
Partial Supplementary European Search Report dated Jun. 1, 2021 in European Patent Application No. 18864662.4.
Chinese Office Action dated Jul. 5, 2021 in Chinese Application No. 201880064756.9, with English translation.
Japanese Office Action dated Aug. 3, 2021 in Japanese Application No. 2017-195651, with English translation.
International Search Report dated Dec. 11, 2018 in International (PCT) Application No. PCT/JP2018/036970.
Chinese Office Action dated Jul. 30, 2021 in corresponding Chinese Application No. 201880064740.8, with English translation.
Japanese Office Action dated Aug. 3, 2021 in corresponding Japanese Application No. 2017-195652, with English translation.
International Search Report dated Dec. 11, 2018 in International (PCT) Application No. PCT/JP2018/036971.
Jiang et al. "Study on Kinetics of Palladium Inorganic Composite Membrane Prepared by Yb-La modified Electroless Plating", Chinese Rare Earths, Apr. 2008, vol. 29, No. 2, pp. 95 -99, With English Abstract & cited in ISR.
Office Action dated Jul. 28, 2022 in Taiwanese Patent Application No. 107135168, with English-language translation.

(Continued)

*Primary Examiner* — Melissa S Swain
*Assistant Examiner* — Keling Zhang
(74) *Attorney, Agent, or Firm* — Wenderoth, Lind & Ponack, L.L.P.

(57) ABSTRACT

An object of the present invention is to provide an electroless Pd plating solution which enables formation of a Pd plating film forming a plating film having excellent wire bondability even after a high-temperature thermal history. An electroless Pd plating solution of the present invention includes: a Palladium compound, a reducing agent, a complexing agent, and at least one selected from a group consisting of Ge and rare earth element.

5 Claims, No Drawings

(56) References Cited

OTHER PUBLICATIONS

Office Action datedApr. 1, 2022 in corresponding Chinese Patent Application No. 201880064740.8, with machine English-language translation.
Advisory Action dated Apr. 1, 2022 in related U.S. Appl. No. 16/753,417.
Decision of Rejection datedMay 25, 2022 in Chinese Patent Application No. 201880064756.9, with English translation.
Office Action dated May 25, 2022 in Taiwanese Patent Application No. 107135158, with English translation.
Office Action dated Jun. 2, 2022 in U.S. Appl. No. 16/753,417.
Chinese Office Action dated Jan. 11, 2022 in Chinese Application No. CN 201880064756.9, with Machine translation.
Notice of Reasons for Refusal dated Mar. 15, 2022 in Japanese Application No. 2017-195651, with Machine translation.
Final Office Action dated Jan. 25, 2022 in U.S. Appl. No. 16/753,417.
Decision of Rejection dated Nov. 2, 2022 in Taiwanese Patent Application No. 107135158, with English-language translation.
Decision of Rejection dated Dec. 26, 2022 in corresponding Chinese Patent Application No. 201880064740.8, with English translation.
Final Office Action dated Jan. 12, 2023 in U.S. Appl. No. 16/753,417.
Korean Office Action dated May 25, 2023 in Korean Patent Application No. 10-2020-7011966, with English machine translation.
Korean Office Action dated May 25, 2023 in Korean Patent Application No. 10-2020-7011967, with English machine translation.
Chinese Office Action dated Sep. 2, 2022 in corresponding Chinese Patent Application No. 201880064740.8, with English-language translation.
Communication pursuant to Article 94(3) EPC dated Sep. 20, 2022 in corresponding European Patent Application No. 18 864 488.4.
European Office Action dated Nov. 23, 2023 in corresponding European Patent Application No. 18864488.4.
Korean Office Action dated Nov. 25, 2023 in related Korean Patent Application No. 10 2020 7011967, with English machine translation.
Korean Office Action dated Nov. 26, 2023 in corresponding Korean Patent Application No. 10 2020 7011966, with English machine translation.

* cited by examiner

ELECTROLESS PALLADIUM PLATING SOLUTION

TECHNICAL FIELD

The present invention relates to an electroless palladium plating solution.

BACKGROUND ART

In the electronics industry, electroless nickel electroless palladium immersion gold (ENEPIG), which can add an effect of being excellent in plating film properties such as solder bondability and wire bondability, is commonly used as a method for treating a surface of a circuit of a printed board, or a mounting portion or a terminal portion of an IC package. A plating film obtained by sequentially applying an electroless nickel plating film (hereinafter, sometimes referred to as a "Ni plating film"), an electroless palladium plating film (hereinafter, sometimes referred to as a "Pd plating film") and an immersion gold plating film (hereinafter, sometimes referred to as an "Au plating film") through the ENEPIG process (hereinafter, sometimes referred to as an "electroless Ni/Pd/Au plating film") is commonly used.

In recent years, a technique has been proposed in which plating film properties are improved by, for example, modifying an electroless palladium plating solution (hereinafter, sometimes referred to as an "electroless Pd plating solution") in order to secure plating film properties required with miniaturization and enhanced density of electronic components.

For example, Patent Document 1 discloses an electroless Pd plating solution in which as a stabilizer, bismuth or a bismuth compound is used instead of a sulfur compound, resulting in formation of an electroless Pd plating film which has bath stability as high as that achieved with a sulfur compound, and is excellent in corrosion resistance, solder bondability and wire bondability.

Patent Document 2 discloses an electroless Pd plating solution containing Pd salt, inorganic acid and inorganic compounds (Cu, Tl, Se, and Te). The solution can form an uniform Pd thin film with decreased numbers of pores on a Ni film.

PRIOR ART DOCUMENT

Patent Documents

Patent Document 1: JP4596553B1
Patent Document 2: JP4792045B1

SUMMARY OF THE INVENTION

Problems to be Solved by the Invention

Electroless Ni/Pd/Au plating films which are commonly used exhibit excellent wire bondability before being exposed to a high-temperature thermal history in reflow treatment or the like, but has the problem that wire bondability is significantly deteriorated after the high-temperature thermal history.

The present invention has been made in view of the circumstances as described above, and an object of the present invention is to provide an electroless Pd plating solution which enables formation of a Pd plating film forming a plating film having excellent wire bondability even after a high-temperature thermal history.

Solution to Problem

An electroless Pd plating solution of the present invention solved above problems, the solution includes:
 a Palladium compound;
 a reducing agent;
 a complexing agent; and
 at least one selected from a group consisting of Ge and rare earth element.

As a preferable embodiment of the present invention, the rare earth element is at least one selected from a group consisting of La, Ce, Sm, and Y.

Also as a preferable embodiment of the present invention, the electroless Pd plating solution contains Ge and rare earth element in an amount of 0.1 g/L to 10 g/L.

As preferable embodiment of the present invention, the complexing agent is at least one selected from a group consisting of ammonia and an amine compound. And another preferable embodiment of the present invention, the reducing agent is at least one selected from a group consisting of formic acid, hydrazine, hypophosphorous compounds, phosphorous compounds, amine borane compounds, and hydroboron compounds.

Advantageous Effects of Invention

By using the electroless Pd plating solution of the present invention, a Pd plating film forming a plating film having excellent wire bondability even after a high-temperature thermal history in reflow treatment or the like can be obtained.

DESCRIPTION OF EMBODIMENTS

The present inventors have extensively conducted studies on a cause of a phenomenon in which when a layered plating film with a Au plating film formed on a Pd plating film (hereinafter, sometimes referred to as a "Pd/Au layered plating film") is exposed to a high-temperature thermal history in reflow or the like, the connection success rate in subsequent wire bonding is significantly reduced. Resultantly, it has been considered that exposure to a high-temperature thermal history causes Pd to diffuse to a Au plating film surface, so that a Pd—Au solid solution is formed on the Au plating film surface, resulting in reduction of the connection success rate in wire bonding. One solution for such a problem may be formation of a Au plating film with a large thickness, but this solution leads to a significant increase in cost.

The present inventors have further conducted studies, and resultantly found that when a Pd plating film obtained using the electroless Pd plating solution containing at least one selected from a group consisting of Ge and rare earth elements (hereinafter, sometimes referred to as a "Ge-rare earth element group") is formed as an under-layer of the Au plating film, wire bondability after a high-temperature thermal history can be improved.

That is, when the Pd plating film obtained using the electroless Pd plating solution containing Ge-rare earth element group, formation of a Pd—Au solid solution on the Au plating film surface caused by Pd diffusion to the Au plating film surface can be suppressed even when the film is exposed to a high-temperature thermal history (hereinafter, sometimes referred to as a "inhibitory effect on solid-dissolution after high-temperature thermal history"). And as a result, wire bondability more excellent than ever before can be obtained even when the thickness of the film is equivalent to or less than that of a conventional Au plating film.

Examples of the invention disclose the followings. Examples containing the Ge-rare earth element group of the invention showed the same wire bondability before the heat treatment as Examples containing no Ge-rare earth element group of the invention. However, the Examples containing no Ge-rare earth element group significantly reduced wire bondability after the heat treatment as for examples, comparing sample No. 2 with sample No. 12 and sample No. 8 with sample No. 13. The results indicate that the present inventive the electroless Pd plating solution containing containing the Ge-rare earth element group provides the excellent inhibitory effect on solid-dissolution after high-temperature thermal history.

The present inventors confirmed that electroless Pd plating solutions containing metals such as Ta, W, Co instead of the Ge-rare earth element group of the present invention provides no inhibitory effect on solid-dissolution after high-temperature thermal history. Therefore, the present invention provides the unique effect by using the specific electroless Pd plating solution containing the Ge-rare earth element group.

The Pd plating film having the inhibitory effect on solid-dissolution after high-temperature thermal history is easily obtained by using the present inventive electroless Pd plating solution. More specifically, the electroless Pd plating solution of the present invention contains a Palladium compound, a reducing agent, a complexing agent, and at least one selected from a group consisting of Ge and rare earth elements. Details of the present inventive electroless Pd plating solution is described below.

At least one selected from a group consisting of Ge and rare earth elements

Ge and rare earth elements is metal exhibiting the inhibitory effect on solid-dissolution after high-temperature thermal history. The rare earth elements of the present invention means Sc, Y, La, Ce, Pr, Nd, Pm, Sm, Eu, Gd, Tb, Dy, Ho, Er, Tm, Yb, and Lu. Among these rare earth elements, the present invention preferably selects at least one rare earth elements having solubility in the electroless Pd plating solution and more preferably selects at least one selected from a group consisting of Ge, La, Ce, Sm, and Y. The source of Ge and the rare earth element is not particularly limited, and various known compounds such as oxides and chlorides of Ge and the rare earth element and metals can be used. Particularly, preferable known compounds includes salt of Ge-rare earth element group, and the inorganic acid. As the Ge salt and the rare earth salt, examples include water-soluble salts such as nitrates, sulfates, chlorides, and acetates. Examples of the Ge source include metal additives such as germanium oxide and germanium chloride. Preferred sources of the rare earth elements include metal additives such as lanthanum oxide, lanthanum chloride, lanthanum sulfate, lanthanum nitrate; cerium oxide, cerium chloride, cerium sulfate, cerium nitrate; samarium oxide, samarium chloride, samarium sulfate, samarium nitrate; yttrium oxide, yttrium chloride, yttrium sulfate, yttrium nitrate. These additives may be used alone or in combination of two or more.

Shortage amount of the Ge-rare earth element group of the present invention in the electroless Pd plating solution may result in insufficient inhibitory effect on solid-dissolution after high-temperature thermal history. Excess amount of the Ge-rare earth element group may result in liquid turbidity of the electroless Pd plating solution. Therefore, the content of the Ge-rare earth element group of the present invention contained in the electroless Pd plating solution (a single amount when contained alone, or a total amount when two or more kinds are contained) is preferably 0.1 g/L or more, more preferably 0.2 g/L or more, still more preferably 0.5 g/L or more, and preferably 10 g/L or less, more preferably 5 g/L or less, still more preferably 3 g/L or less.

The composition of the electroless Pd plating solution of the present invention is appropriately adjusted within a range that does not impair the above effects of the Ge-rare earth element group of the present invention. A better inhibitory effect on solid-dissolution after high-temperature thermal history can be obtained by appropriately selecting a reducing agent, a complexing agent, and other ingredients.

Palladium Compound

The palladium compound is a source of palladium ions for obtaining palladium plating. The palladium compound is not limited as long as it is soluble in water, and examples of the palladium compound that can be used include inorganic water-soluble palladium salts such as palladium chloride, palladium sulfate and palladium acetate; and organic water-soluble palladium salts such as tetraaminepalladium hydrochloride, tetraaminepalladium sulfate, tetraaminepalladium acetate, tetraaminepalladium nitrate and dichlorodiethylene diaminepalladium. These palladium compounds may be used alone, or in combination of two or more thereof. The Pd ion concentration in the electroless Pd plating solution is not limited, and when the Pd ion concentration is excessively low, the deposition rate of the plating film may be significantly reduced. On the other hand, when the Pd ion concentration is excessively high, the physical properties of the film may be deteriorated due to abnormal deposition or the like. Therefore, the content of the Pd ion concentration in the electroless Pd plating solution is preferably 0.01 g/L or more, more preferably 0.1 g/L or more, still more preferably 1 g/L or more, and preferably 10 g/L or less, more preferably 8 g/L or less, still more preferably 5 g/L or less. Pd ions are measured by atomic absorption spectrometry (AAS) using an atomic absorption spectrophotometer.

A Reducing Agent

The reducing agent acts for depositing Pd in the electroless Pd plating solution. The reducing agent may be any of various known reducing agents. The preferable reducing agents in combination with the Ge-rare earth element group for exhibiting inhibitory effect on solid-dissolution after high-temperature thermal history include at least one selected from the group consisting of formic acid, hydrazine, hypophosphorous compounds, phosphorous compounds, amine borane compounds, and hydroboron compounds. Examples of the hypophosphorous acid compound include hypophosphorous acid and hypophosphites such as sodium hypophosphite, and examples of the phosphite compound include phosphorous acid and phosphites such as sodium phosphite. Examples of the amine borane compound include dimethylamine borane (DMAB) and trimethylamine borane (TMAB), and examples of the hydroboron compound include alkali metal borohydrides such as sodium borohydride (SBH) and potassium borohydride (KBH). The reducing agent may be used alone, or in combination of two or more thereof.

The amount of the reducing agent appropriately adjusted for balancing the deposition rate during the plating process and the plating solution stability. For securing the sufficient deposition rate and the plating solution stability, the content of the reducing agent in the electroless Pd plating solution (a single-compound amount when one compound is contained, and the total amount when two or more compounds are contained) is preferably 0.5 g/L or more, more preferably 1 g/L or more, still more preferably 2 g/L or more, even more preferably 10 g/L or more, and preferably 100 g/L or less, more preferably 70 g/L or less, still more preferably 50 g/L or less.

Complexing Agent

The complexing agent has mainly a stabilizing action on the solubility of Pd in the electroless Pd plating solution. The complexing agent may be any of various known complexing agents. The preferable complexing agents in combination with the Ge-rare earth element group for exhibiting inhibitory effect on solid-dissolution after high-temperature thermal history include at least one selected from the group consisting of ammonia and an amine compound, more preferably an amine compound. As the amine compound, methylamine, dimethylamine, trimethylamine, benzylamine, methylenediamine, ethylenediamine, ethylenediamine derivative, tetramethylenediamine, diethylenetriamine, ethylenediaminetetraacetic acid (EDTA), alkali metal salts thereof, EDTA derivatives and glycine. The complexing agents can be used alone, or in combination of two or more thereof. The content of the complexing agent in the electroless Pd plating solution (a single-compound amount when one compound is contained, and the total amount when two or more compounds are contained) may be approximately adjusted so as to obtain the above-described action, and is preferably 1 g/L or more, more preferably 2 g/L or more, still more preferably 3 g/L or more, even more preferably 5 g/L or more, and preferably 100 g/L or less, more preferably 50 g/L or less.

Since the electroless Pd plating solution of the present invention exhibits the inhibitory effect on solid-dissolution after high-temperature thermal history as long as it has the above-described component composition, the electroless Pd plating solution may have only the component composition. If necessary, the electroless Pd plating solution may contain various known additives such as a pH adjuster, a stabilizer, a crystal regulator and a wettability improving agent may be added.

pH Adjuster

When the pH of the electroless Pd plating solution of the present invention is excessively low, the deposition rate of Pd easily decreases, and when the pH is excessively high, the stability of the electroless Pd plating solution may be deteriorated. The pH is preferably 4 to 10, more preferably 6 to 8. The pH of the electroless Pd plating solution can be adjusted by adding a known pH adjuster. Examples of the pH adjuster include acids such as hydrochloric acid, sulfuric acid, nitric acid, citric acid, malonic acid, malic acid, tartaric acid and phosphoric acid, and alkalis such as sodium hydroxide, potassium hydroxide and ammonia water. These pH adjusters can be used alone, or in combination of two or more thereof.

Stabilizer

The stabilizer is optionally added for the purpose of, for example, securing plating stability, improving the appearance after plating, and adjusting the plating film formation rate. The electroless Pd plating solution of the present invention may further contain a known sulfur-containing compound. The sulfur-containing compound is preferably one or more selected from, for example, a thioether compound, a thiocyan compound, a thiocarbonyl compound, a thiol compound, thiosulfuric acid and a thiosulfate. Specific examples thereof include thioether compounds such as methionine, dimethylsulfoxide, thiodiglycolic acid and benzothiazole; thiocyan compounds such as thiocyanic acid, potassium thiocyanate, sodium thiocyanate and ammonium thiocyanate; thiocarbonyl compounds such as thiourea and derivatives thereof; thiol compounds such as cysteine, thiolactic acid, thioglycolic acid, mercaptoethanol and butanethiol; and thiosulfates such as sodium thiosulfate. These sulfur-containing compounds can be used alone, or in combination of two or more thereof. The content of the stabilizer in the electroless Pd plating solution (a single-compound amount when one compound is contained, and the total amount when two or more compounds are contained) may be approximately adjusted so as to obtain an effect such as plating stability, and is preferably 0.1 mg/L or more, more preferably 0.5 mg/L or more, still more preferably 1 mg/L or more, even more preferably 5 mg/L or more, most preferably 10 mg/L or more, and preferably 500 mg/L or less, more preferably 100 mg/L or less, still more preferably 80 mg/L or less, most preferably 60 mg/L.

The electroless Pd plating solution of the present invention does not contain a surfactant. When a surfactant is added to the electroless Pd plating solution of the present invention, the surfactant is adsorbed to a surface of the resulting Pd plating film, so that formability of the Au plating film is deteriorated. As a result, wire bondability to the high-temperature thermal history, is deteriorated. The surfactant is any of various known nonionic, cationic, anionic and amphoteric surfactants.

The electroless Pd plating solution of the present invention is also suitable for a Pd/Au layered plating film with an Au plating film stacked on a Pd plating film, which is preferably used for plating for bonding of electronic components, etc. Therefore, a layered plating film having the Pd plating film formed by the electroless Pd plating solution of the present invention and the Au plating film is also a preferred embodiment. The Pd plating film of the present invention can be confirmed to have an inhibitory effect on solid-dissolution after high-temperature thermal history of Pd in a Pd/Au layered plating film in which at least a Au plating film is stacked. Therefore, the base that forms the Pd plating film is not limited, and examples thereof include various known base materials such as Al, Al-based alloys, Cu and Cu-based alloys, and plating films in which a base material is covered with a metal catalytic for reduction and deposition of the Pd plating film, such as Fe, Co, Ni, Cu, Zn, Ag, Au, Pt and alloys thereof. Even a noncatalytic metal can be used as an object to be plated in various methods.

In another preferred embodiment, the electroless Pd plating solution of the present invention can be applied to the ENEPIG process. In the ENEPIG process, an electroless Ni/Pd/Au plating film can be obtained by forming a Ni plating film, then a Pd plating film, and then a Au plating film on, for example, Al, an Al-based alloy, Cu or a Cu-based alloy that forms an electrode. For the formation of each plating film, a common method may be employed. Hereinafter, a method for producing an electroless Ni/Pd/Au plating film on the basis of the ENEPIG process will be described, but the conditions for formation of the Pd plating film formed by using the electroless Pd plating solution of the present invention are not limited thereto, and can be appropriately changed on the basis of a known technique.

The plating conditions and plating apparatus at the time of performing electroless Ni plating using an electroless Ni plating solution are not particularly limited, and any of various known methods can be appropriately selected. For example, an object to be plated may be brought into contact with the electroless Ni plating solution at a temperature of 50 to 95° C. for about 15 to 60 minutes. The thickness of the Ni plating film may be appropriately set according to the required properties, and is typically about 3 to 7 μm. Any of various known compositions such as Ni—P alloys and Ni—B alloys can be used for the electroless Ni plating solution.

The plating conditions and plating apparatus at the time of performing electroless Pd plating using the electroless Pd plating solution of the present invention are not particularly limited, and any of various known methods can be appropriately selected. For example, an object to be plated, on which a Ni plating film is formed, may be brought into contact with the electroless Pd plating solution at a temperature of 50 to 95° C. for about 15 to 60 minutes. The thickness of the Pd plating film may be appropriately set according to the required properties, and is typically about 0.001 to 0.5 μm.

The plating conditions and plating apparatus at the time of performing electroless gold plating using an electroless gold plating solution are not particularly limited, and any of various known methods can be appropriately selected. For example, an object to be plated, on which a Pd plating film is formed, may be brought into contact with the electroless gold plating solution at a temperature of 40 to 90° C. for about 3 to 20 minutes. The thickness of the gold plating film may be appropriately set according to the required properties, and is typically about 0.01 to 2 μm.

When the Pd plating film formed by using the electroless Pd plating solution of the present invention is used, Pd can be inhibited from being diffused to and solid-dissolved in the Au plating film from the Pd plating film due to a thermal history in a mounting process after formation of the film, such as reflow treatment, and therefore excellent wire bondability can be achieved even after the thermal history. The temperature in the thermal history is a temperature at which the mounting process is carried out, and the temperature is not particularly limited. When the Pd plating film of the present invention is used, excellent wire bondability can be achieved even after a thermal history at a high temperature of, for example, 50° C. or higher, more preferably 100° C. or higher.

By stacking an Au plating film on a Pd plating film obtained using the electroless Pd plating solution of the present invention, excellent wire bondability can be achieved even after a thermal history. Thus, the plating film is preferably used for electronic equipment components. Examples of the electronic equipment component include components that form electronic equipment, such as chip components, crystal oscillators, bumps, connectors, lead frames, hoop materials, semiconductor packages and printed circuit boards. In particular, the plating film is suitably used for a technique for forming UBM (Under Barrier Metal) for solder bonding and wire bonding (W/B) to an Al electrode or a Cu electrode on a wafer.

This application claims the benefit of the priority date of Japanese patent application No. 2017-195652 filed on Oct. 6, 2017. All of the contents of the Japanese patent application No. 2017-195652 filed on Oct. 6, 2017 are incorporated by reference herein.

EXAMPLES

Hereinafter, the present invention will be described in more detail with reference to examples, but the present invention is in no way limited to the following examples, and of course, changes can be appropriately made as long as the above-described and later-described purposes are met. All of these changes are encompassed in the technical scope of the present invention.

A BGA substrate (Ball Grid Array: Uyemura & Co., Ltd., 5 cm×5 cm) was sequentially subjected to the pretreatment and plating treatment shown in Table 1, thereby producing test pieces 1 to 22 in which a Ni plating film, a Pd plating film and a Au plating film are formed in this order from the substrate side. The wire bondability of each of the obtained test pieces was examined.

Wire Bondability

Wire bonding was performed using a test apparatus (Semi-Automatic Wire Bonder HB16 manufactured by TPT K.K.), and wire bondability was evaluated at each of 20 points under the following measurement conditions using Bond Tester SERIES 4000 manufactured by Dage Ltd. The measurement was performed before and after the heat treatment (in which the test piece was held at 175° C. for 16 hours). In evaluation of wire bondability, a test piece having an average wire bonding strength of 9.0 g or more after heat treatment was rated "Excellent", a test piece having an average wire bonding strength of 8.5 g or more and less than 9.0 g after heat treatment was rated "Good", a test piece having an average wire bonding strength of 7.5 g or more and less than 8.5 g after heat treatment was rated "Acceptable", and a test piece having an average wire bonding strength of less than 7.5 g after heat treatment was rated "Poor".

[Measurement Conditions]
Capillary: B1014-51-18-12 (manufactured by PECO Ltd.)
Wire: 1 mil-Au wire (SPM Ltd.)
Stage temperature: 150° C.
Ultrasonic wave (mW): 250 (1st), 250 (2nd)
Bonding time (ms): 200 (1st), 50 (2nd)
Tensile force (gf): 25 (1st), 50 (2nd)
Step (1st to 2nd length): 0.7 mm
Measurement method: Wire pull test
Test speed: 170 μm/sec

TABLE 1

| Steps | | Name of chemicals | Treatment temperature | Treatment time (min.) | Target film thickness |
|---|---|---|---|---|---|
| Pretreatment | Cleaner | ACL-007$_{X1}$ | 50° C. | 5 | — |
| | Soft etching | SPS$_{X1}$ | 25° C. | 1 | — |
| | Pickling | 10% $H_2SO_4$ | room temperature | 1 | — |
| | Predip | 3% $H_2SO_4$ | room temperature | 1 | — |
| | activator | MNK-4$_{X1}$ | 30° C. | 2 | — |
| plating treatment | electroless Ni plating | NPR-4$_{X1}$ | 80° C. | 30 | 6 um |
| | electroless Pd plating | | see Table 2 | | 0.1 um |
| | electroless Au plating | TWX-40$_{X1}$ | 80° C. | 13 | 0.1 um |

$_{X1}$available from C. Uyemura & Co., Ltd.

TABLE 2

| | | Test piece No. | | | | | | | | | | | | | | | | | | | | | |
|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| Pd salt | tetraamine Pd hydrochloride [g/L] | 2 | 2 | | | | | | | | | | | | | | | | | | | | |
| Pd salt | tetraamine Pd sulfate [g/L] | | | 2 | 2 | 2 | 2 | 2 | 2 | 2 | | 2 | 2 | 2 | | 2 | 2 | 2 | 2 | 2 | 2 | | |
| Pd salt | tetraamine Pd nitrate [g/L] | | | | | | | | | | 2 | | | | 2 | | | | | | | 2 | 2 |
| Metal additive | germanium oxide [g/L] | | | | | 1 | 2 | 2 | | 1 | 1 | | | | | | | | | | | | |
| | cerium sulfate [g/L] | | | 1 | | | 1 | 1 | 1 | 1 | | | | | | | | | | | | | |
| | lanthanum oxide [g/L] | | | | | | | | 1 | 1 | | | | | | | | | | | | | |
| | samarium chloride [g/L] | | | | 1 | | | | | | | | | | | | | | | | | | |
| | yttrium chloride [g/L] | 1 | | | | | | | | | 1 | | | | | | | | | | | | |
| | sodium tantalate [g/L] | | | | | | | | | | | | | | | | | | | | 1 | | |
| | sodium tungstate [g/L] | | | | | | | | | | | | | | | | | | | | | 1 | |
| | cobalt sulfate [g/L] | | | | | | | | | | | | | | | | | | | | | | 1 |
| Complexing agent | ethylenediamine [g/L] | 20 | 20 | 20 | 20 | 20 | 20 | 20 | 20 | 20 | 20 | 20 | 20 | 20 | 20 | 20 | 20 | 20 | 20 | 20 | 20 | 20 | 20 |
| | EDTA·2Na [g/L] | 20 | 20 | 20 | 20 | 20 | 20 | 20 | 20 | 20 | 20 | 20 | 20 | 20 | 20 | 20 | 20 | 20 | 20 | 20 | 20 | 20 | 20 |
| Reducing agent | formic acid [g/L] | 40 | 40 | | | | | | | | | | 40 | | | | | | 40 | | 40 | | |
| | hydrazine [g/L] | | | | | 20 | | | 20 | | | | | 20 | | | | | | | | | |
| | hypophosphorous acid [g/L] | | | 25 | | | | | | 25 | | | | | 25 | | | | | | | 25 | |
| | phosphorous acid [g/L] | | | | 15 | | | | | | | | | | | 15 | | | | | | | |
| | dimethylamine borane [g/L] | | | | | | 20 | | | | 20 | | | | | | 20 | | | | | | |
| | trimethylamine borane [g/L] | | | | | | | 20 | | | | | | | | | | 20 | | 20 | | | 20 |
| pH adjuster | citric acid [g/L] | 20 | | 20 | | 30 | 30 | 30 | | 30 | 30 | 30 | 30 | 30 | 30 | 30 | 30 | 30 | 30 | 30 | 30 | 30 | 30 |
| | malic acid [g/L] | | 30 | | 30 | | | | 30 | | | | | | | | | | | | | | |
| | tartaric acid [g/L] | | | 50 | | | | | | | | | | | | 50 | | 50 | | | | | |
| Additive | sodium thiosulfate [mg/L] | | | | 50 | | | | | | 50 | | | | | | | | | | | | |
| | thioglycolic acid [mg/L] | | | | | | | | | | | | | | | | | | | | | | |
| Surfactant | sodium lauryl sulfate [g/L] | | | | | | | | | | | | | | | | | | 5 | 5 | | | |
| | polyoxyethylene alkyl ether [g/L] | | | | | | | | | | | | | | | | | | | | | | |
| Plating bath | Bath temperature [°C] | 60 | 60 | 55 | 55 | 70 | 50 | 50 | 70 | 55 | 50 | 65 | 60 | 70 | 55 | 55 | 50 | 50 | 55 | 55 | 60 | 55 | 50 |
| | pH [—] | 7.0 | 7.0 | 7.0 | 7.0 | 7.0 | 7.0 | 7.0 | 7.0 | 7.0 | 7.0 | 5.5 | 7.0 | 7.0 | 7.0 | 7.0 | 7.0 | 7.0 | 7.0 | 7.0 | 7.0 | 7.0 | 7.0 |
| Wire pull average strength | before heat treatment [g] | 11.3 | 11.2 | 10.8 | 11.5 | 11.6 | 11.2 | 10.8 | 11.5 | 11.5 | 11.8 | 8.6 | 10.8 | 11.4 | 11.5 | 10.9 | 11.1 | 10.9 | 9.8 | 9.5 | 10.3 | 10.1 | 10.7 |
| | after heat treatment [g] | 8.6 | 8.6 | 8.5 | 8.5 | 8.7 | 9.1 | 8.9 | 9.0 | 8.9 | 8.6 | 3.8 | 7.4 | 7.3 | 6.8 | 7.0 | 7.0 | 7.1 | 4.6 | 4.1 | 7.4 | 7.5 | 7.1 |

XPd salt(g/L) is Pd ion concentration, Metal additive(g/L) is concentration of Ge · rare earth element group As shown in Table 2, test pieces Nos. 1 to 10 obtained using the electroless Pd plating solution containing a Ge-rare earth element group as defined in the present invention were each rated "Good" or "Excellent" in evaluation of wire bondability after heat treatment.

On the other hand, test pieces Nos. 11 to 17 obtained using a Pd plating solution that did not satisfy the requirements of the present invention were each rated "Poor" in evaluation of wire bondability after heat treatment. Test pieces Nos. 18 and 19 containing a surfactant, and Test pieces Nos. 20 to 22 containing other meal other than Ge-rare earth element group were each rated "Poor" in evaluation of wire bondability after heat treatment.

The invention claimed is:

1. An electroless Pd plating solution consisting of:
   a Palladium compound;
   a reducing agent;
   a complexing agent;
   a compound or metal containing at least one selected from the group consisting of Ge, Ce, Sm, and Y;
   water; and
   optionally, a sulfur-containing compound as a stabilizer,
   wherein a pH of the electroless Pd plating solution is from 4 to 10, and
   a total amount of the at least one selected from the group consisting of Ge, Ce, Sm, and Y in the electroless Pd plating solution is 1 g/L to 10 g/L.

2. The electroless Pd plating solution according to claim 1, wherein
   the complexing agent is at least one selected from the group consisting of ammonia and an amine compound.

3. The electroless Pd plating solution according to claim 1, wherein
   the reducing agent is at least one selected from the group consisting of formic acid, hydrazine, hypophosphorous compounds, phosphorous compounds, amine borane compounds, and hydroboron compounds.

4. The electroless Pd plating solution according to claim 1, wherein the sulfur-containing compound is present.

5. The electroless Pd plating solution according to claim 1, wherein
   the pH of the electroless Pd plating solution is from 4 to 8.

* * * * *